United States Patent [19]

Fogelman

[11] Patent Number: 5,263,272
[45] Date of Patent: Nov. 23, 1993

[54] HIGHWAY EMERGENCY SAFETY SIGN

[75] Inventor: John A. Fogelman, West Nyack, N.Y.

[73] Assignee: The Wise Child Inc., West Nyack, N.Y.

[21] Appl. No.: 693,558

[22] Filed: Apr. 30, 1991

[51] Int. Cl.$^5$ .......................................... G09F 21/04
[52] U.S. Cl. ........................................ 40/591; 40/600
[58] Field of Search ................ 40/590, 591, 617, 589, 40/600, 602, 903, 539; 116/63 R, 63 T, 63 P; 16/225; 160/231.1, 231.2

[56] References Cited

U.S. PATENT DOCUMENTS

| | | | |
|---|---|---|---|
| 485,229 | 11/1892 | Reed | 40/617 |
| 2,096,559 | 10/1937 | Riley | 16/225 |
| 2,166,048 | 6/1939 | Fritsch . | |
| 2,906,657 | 9/1959 | Davidson | 160/231.1 X |
| 2,933,841 | 4/1960 | Lawlor . | |
| 3,147,560 | 9/1964 | Berger et al. . | |
| 3,470,641 | 10/1969 | Meyer . | |
| 3,474,554 | 10/1969 | Des Ormeaux | 40/539 X |
| 3,481,060 | 12/1969 | Hartz . | |
| 3,590,506 | 7/1971 | Jeski | 40/591 |
| 3,623,254 | 11/1971 | Parish, Sr. | 40/591 |
| 3,670,438 | 6/1972 | Carroll et al. | 40/591 X |
| 3,701,210 | 10/1972 | Smith . | |
| 3,709,237 | 1/1973 | Smith | 160/231.1 X |
| 3,797,151 | 3/1974 | Dexter . | |
| 3,903,629 | 9/1975 | Gruna | 40/591 |
| 3,936,967 | 2/1976 | Davis . | |
| 3,949,503 | 4/1976 | Waress . | |
| 4,021,948 | 5/1977 | Mosch | 40/591 |
| 4,044,482 | 8/1977 | Mosch . | |
| 4,062,139 | 12/1977 | Klosel . | |
| 4,129,857 | 12/1978 | Espinosa . | |
| 4,152,854 | 5/1979 | Berry, Jr. et al. . | |
| 4,182,063 | 1/1980 | Klosel . | |
| 4,194,313 | 3/1980 | Downing . | |
| 4,607,444 | 8/1986 | Foster . | |
| 4,611,420 | 9/1986 | Delamere . | |
| 4,876,812 | 10/1989 | Haralson . | |
| 4,912,866 | 4/1990 | Bannister et al. . | |

Primary Examiner—Kenneth J. Dorner
Assistant Examiner—J. Bonifanti
Attorney, Agent, or Firm—Darby & Darby

[57] ABSTRACT

A foldable emergency sign is provided, made up of a number of flat slats joined by flexible hinges. The slats are provided with warning indicia to alert passing motorists to the presence of a disabled vehicle. The slats are also provided with magnets for quick attachment and detachment from a vehicle. A support harness may be provided for attachment to irregularly shaped areas of a vehicle.

5 Claims, 2 Drawing Sheets

HIGHWAY EMERGENCY SAFETY SIGN

FIELD OF THE INVENTION

This invention relates to warning devices for disabled vehicles on roads and highways and more specifically relates to portable safety signs that are carried in the vehicle in case of an emergency.

BACKGROUND OF THE INVENTION

It is known that vehicles have a tendency to breakdown at completely random times, often on a major thoroughfare or highway. It is also known that accidents often occur when the difference in speed between two vehicles is greatest. Of course, the worst case of this is a disabled car on a road with other vehicles traveling at the speed limit.

Distress signs have been developed to inform passing motorists that help is needed by a stranded motorist. Examples of such devices are disclosed in U.S. Pat. No. 3,797,151 to Dexter and U.S. Pat. No. 3,623,254 to Parish, Sr. In U.S. Pat. No. 3,797,151, a magnet is utilized to mount a vertical sign to the top of a vehicle, having a legend such as "Send Help." U.S. Pat. No. 3,623,254 discloses an interchangeable sign exhibitor, where different words may be formed to convey a message from the stranded motorist.

However, these arrangements are merely message centers and do little to help avoid collisions with stationary vehicles. The U.S. Government has set guidelines for warning devices that are intended to improve the visibility of disabled vehicles. The Department of Transportation's Standard 125 recites the scope, application and purpose of warning devices for vehicles. Standard 125 relates to devices without self-contained energy sources that are designed to be carried in motor vehicles and used to warn approaching traffic of the presence of a stopped vehicle.

Standard 125 requires a triangle with specific size and color restrictions. A known device that conforms to Standard 125 is the free standing triangle that is usually seen behind disabled trucks. According to Standard 125, the triangle must be equilateral and from 17 to 22 inches on each side. The outermost 2 to 3 inches must be composed of two colored bands; the outer one being a red reflective material to improve night visibility and the inner band being an orange fluorescent material to improve visibility. The center section of the triangle is open, permitting the passage of wind.

However, the free-standing triangles have the disadvantages of requiring heavy mounting stands or bases, to prevent blowing away in the wind, and usually collapse to a size that can only be stored in the trunk of a car, where luggage and clutter can make them inaccessible. They are also positioned on the ground, while they would be more easily spotted if they were positioned nearer to driver eye level.

Thus, is an object of the invention to provide a portable, collapsible, highway emergency sign. It is another sign that conforms to Standard 125, is easily portable, and is collapsible so it can be stored in the glove compartment of a vehicle.

It is a further object of my invention to provide a safety sign that is flexible and can generally conform to the contours of various parts of a vehicle, depending on where the sign is attached to the vehicle.

Another object of my invention is to provide a safety sign that includes means for quickly attaching/detaching the sign to a vehicle.

A further object of my invention is to protect the warning indicia on the sign when not in use.

In accordance with my invention, a foldable emergency sign comprises a number of flat slats joined by flexible hinges. The slats carry warning indicia to alert passing motorists to the presence of the disabled vehicle. The slats are also provided with magnets for quick attachment and detachment from a vehicle. A supporting harness may be provided for attaching the emergency sign to the irregularly shaped areas of a vehicle.

The foregoing and other objects and advantages of this invention will become apparent to those skilled in the art upon reading the following detailed description of a preferred embodiment in conjunction with a review of the appended drawings.

DETAILED DESCRIPTION OF THE INVENTION

Figure 1:
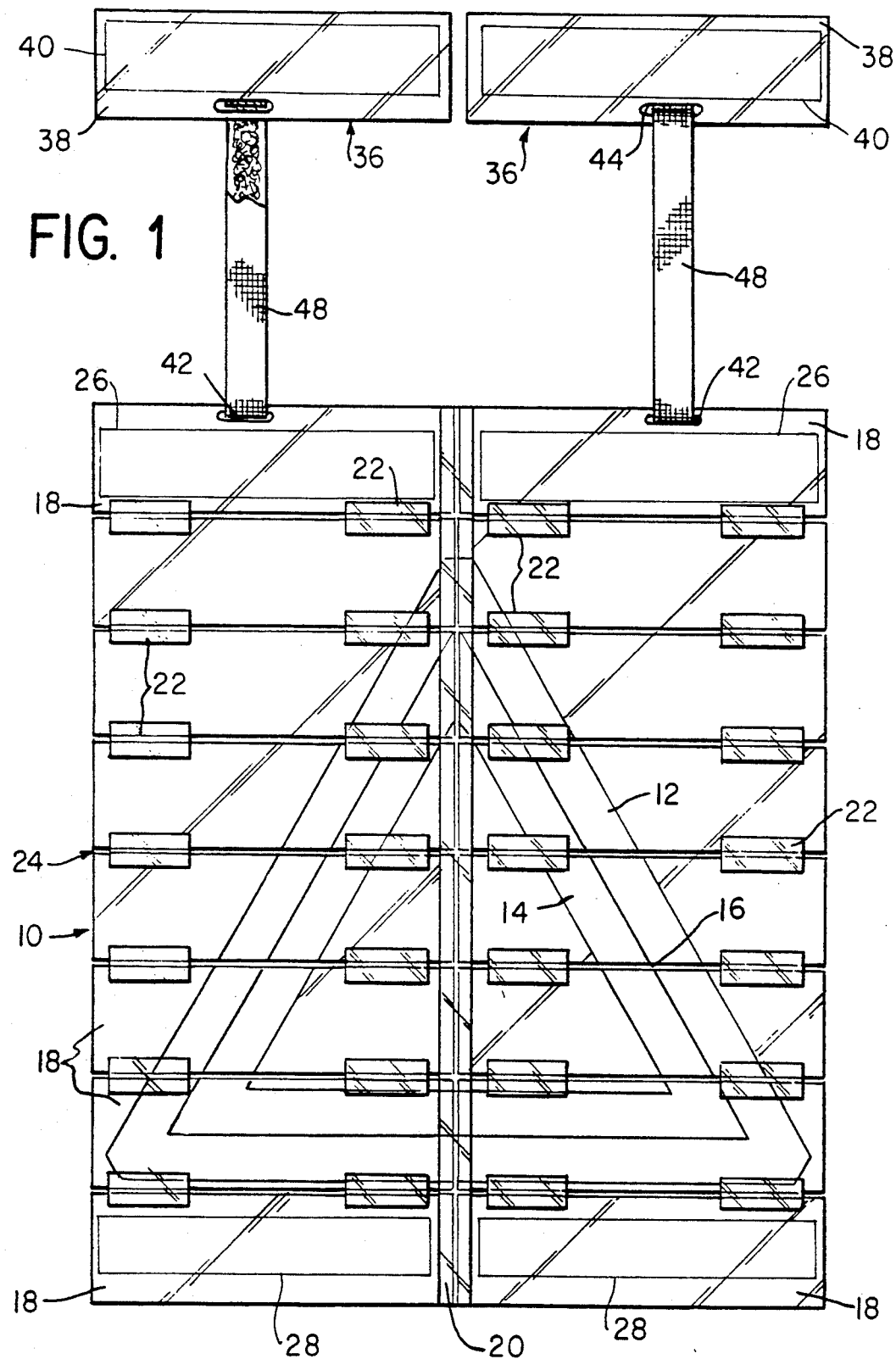
FIG. 1 is a detailed front view of an illustrative embodiment of my invention.

Turning now to the drawings, there is depicted in FIG. 1 a portable, collapsible highway sign 10 in accordance with one specific illustrative embodiment of my invention. The highway sign comprises a plurality of rectangular slats 18 arranged in two columns interconnected by a long hinge 20 connecting the two columns of slats and short intermediate hinges 22 connecting the individual slats in each column. Positioned on the outer surface of the slats, but preferably not on the surface of the uppermost and lowermost slats 18, is the visual warning indicator, conforming to the federal standards. The warning indicator, in this embodiment of my invention, comprises an outer, generally equilateral triangle 12, and another inner, generally equilateral triangle 14, described further below.

While the safety sign in accordance with my invention may be quite large, as of the order of two feet or more high, and therefore may have a large and readily visible warning indicator, it is an aspect of my invention that the safety sign can readily be folded, first along the lengthwise hinge 20 so that the two columns are folded together, and then in accordion fashion on the intermediate hinges 22. The resultant folded sign is quite small and can readily fit into the usual glove compartment in a car.

A collapsible highway warning sign in accordance with my invention further has the advantage that it can readily and easily be manufactured. Specifically, I have found for one specific embodiment that the sign may readily be constructed from a single 20" by 24" vinyl sheet which is approximately 0.002 inches thick. The warning indicator triangle may advantageously have sides between 17" and 22" long with one bottom side positioned horizontally. The sides of the triangle 12 may be of any suitable size but are preferably between 0.75" and 1.75" wide and made of a red reflective material. A preferred reflective material is 3M SCOTCHLITE (3M Corporation, St. Paul, Minn.) Reflective Sheeting, high intensity grade. The SCOTCHLITE material has an encapsulated lens. Any highly reflective paint material that reflects incident light may be used in this element of the sign, e.g., a fresnel lens. However, to be useful in the invention, the material must be at least partially flexible, i.e., the light reflective material cannot be rigid. This material also has a pressure sensitive adhesive on the rear (non-reflective) surface. The adhesive is used to apply the material to the vinyl sheet for easy application. The dimensions of the outer triangle 12 leave approximately 4" borders at the top and bottom of the vinyl sheet. An inner triangle 14 is also mounted on the vinyl sheet within the triangle 12. The inner triangle has a width of between about 1.25" and 1.30". The triangle 14 is made of an orange fluorescent material, preferably 3M SCOTCHCAL/CONTROLTAC Marking Film, Yellow Orange No. 3483 (available from the 3M Corporation, St. Paul, Minn.). This material also has a pressure sensitive adhesive on the rear (non-reflective) surface. The center section 16 may be left bare or can preferably be provided with a silver color reflective material preferably the same material as outer triangle 12, but in silver. These different color zones can be overlapped to improve the appearance and contrast of the borders. The corners of the outer triangle 12 are chamfered. Similar triangles may also be applied to the back side of the sign 10 if desired.

To fabricate this embodiment of my invention, the vinyl sheet is then cut to produce sixteen rectangular slats 18. Preferably each slat is 3" by 10". The two triangles 12 and 14 and the center section 16 are advantageously not disposed on the top two and bottom two slats. The hinges 20 and 22 allow adjacent slats 18 to be folded on top of each other, in accordance with an aspect of my invention. The hinges 20 and 22 space the slats 18 apart by approximately ⅛" to provide gaps 24 for wind to pass through the sign 10 and to make the sign 10 easier to fold. The hinges 20 and 22 are preferably made of plastic, e.g. polyester, polyethylene, vinyl or mylar, tape. However various other types of cloth or plastic hinges that engage the side edges of adjacent slats may be employed in my invention. The center hinge 20 extends the entire length of the sign 10. Side hinges 22 are preferably positioned both near the center and near the outer edge of the slats 18 for stability.

Affixed to the top two slats 18, on the back face 10, which is on the opposite side of the triangles 12 and 14, are flexible magnetic strips 26. The strips are designed to enable the sign to be attached to a metal surface and are preferably attached with adhesive transfer tape. Similar magnet strips 28 are attached to the bottom two slats 18. The magnet strips 26 and 28 are preferably 0.125" thick by 2" wide and extend nearly the length of the respective slats 18.

A particular advantage of the sign construction of my present invention is that it may be quickly collapsed into a compact bundle that is easily stored in a small space, e.g. the glove compartment of an auto. To collapse the sign 10 for storage, it is first folded horizontally along the center hinge 20, with the triangles 12 and 14 being folded into face to face contact with one another. The sign 10 is then folded on the hinges 22 in accordion fashion. In this position, the reflective and fluorescent triangles 12 and 14 are not exposed and are protected from damage. Once in this folded configuration, the sign 10 is compact enough to be stored in a pouch in a vehicle glove compartment. The sign 10 does not require storage in a trunk or its own separate compartment.

Figure 2:
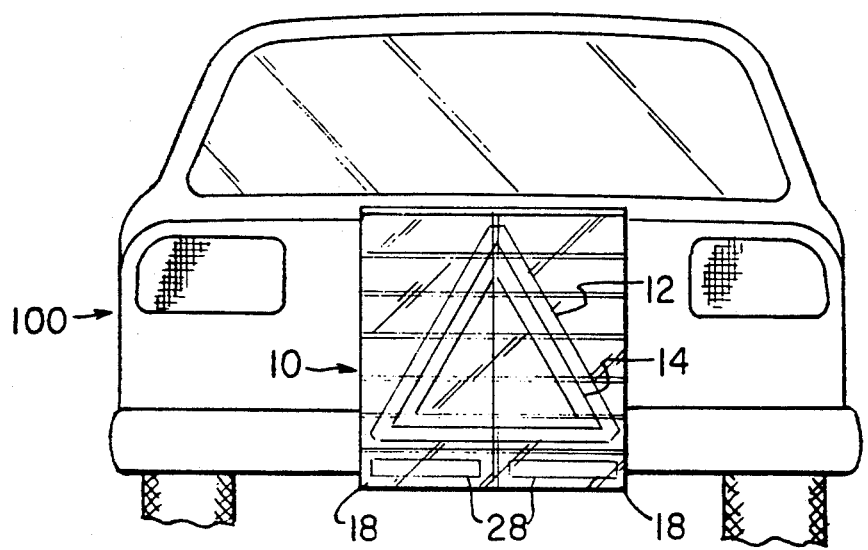
FIG. 2 is a front view of an embodiment of the invention, mounted on the rear of a vehicle.
Figure 3:
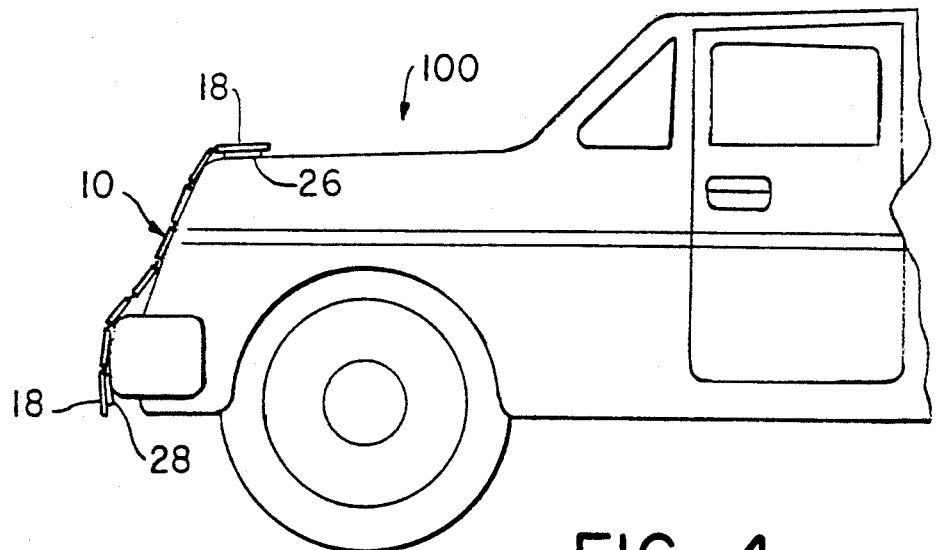
FIG. 3 is a side view of the invention mounted to the front of a vehicle.

In the unfolded position, the sign 10 can be attached to a vehicle by simply applying the top magnets 26 to any metal surface of the vehicle 100, as seen in FIGS. 2 and 3. The remainder of the sign 10 will hang down, while the bottom magnets 28 will either hang freely or preferably attach to a lower metal surface. By way of non-limiting example, the magnets 26 could be attached to the top side of a trunk lid, while the portion of the sign 10 with the triangles 12 and 14 would hang down the rear of the vehicle 100, facing oncoming traffic. The folding, set-up, attachment and detachment of the sign 10 are accomplished without tools and with minimum time and effort.

Figure 4:
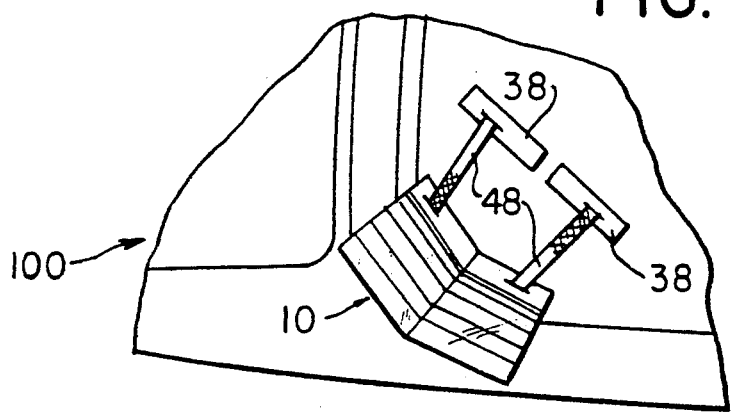
FIG. 4 is a top view of the invention mounted to a corner of a vehicle.

If attachment to an irregular-shaped surface, as in FIG. 4, is necessary, a support harness 36 is also provided in accordance with another aspect of my invention. Two support slats 38, preferably having the same size and shape as slats 18, have flexible support magnets 40 attached to them with transfer tape. For attachment to the support harness 36, the top two slats 18, above the magnet strips 26, are provided with support holes 42. Attached to the support slats 38 through support holes 44 are belts 48. The belts 48 are threaded through the holes 42 and the holes 44. Hook and loop fasteners, such as those sold under the trademark VELCRO (Velcro U.S.A. Inc. Manchester, N.H.) are provided along the belts 48 to secure the belts 48 onto themselves, forming a loop connecting the sign 10 and the support harness 36.

Either with or without the support harness 36, the sign 10 can be mounted at many adjustable positions on the vehicle, allowing a stranded motorist to place the sign 10 facing oncoming traffic and at nearly oncoming driver's eye level.

While the embodiment of the invention shown and described is fully capable of achieving the results desired, it is to be understood that this embodiment has been shown and described for purposes of illustration only and not for purposes of limitation.

What is claimed is:

1. A contourable portable highway emergency sign for a vehicle comprising:
   a plurality of slats:
   a plurality of flexible connecting means, each of said connecting means connecting adjacent ones of said slats such that said adjacent slats may be folded onto each other along said connecting means, said slats having a warning indicia formed thereon and extending over a plurality of said slats,
   attachment means mounted on at least one of said slats for attaching said sign to a surface of the vehicle; and
   a support harness connected to the uppermost of said slats, said harness including means for attachment to the surface of the vehicle and at least one strap for flexible connection to said slats, the flexibility of said flexible connecting means and said strap causing said sign to conform to the contours of said surface.

2. A sign according to claim 1 wherein said support harness comprises at least one magnetic strip.

3. A sign according to claim 1 wherein said harness is foldable.

4. A sign according to claim 1 wherein said strap includes hook and loop means for attachment to said harness and said slats.

5. A contourable portable highway emergency sign capable of being stored in a small space comprising:
a plurality of slats arranged in two columns;
a first longitudinal hinge made of flexible material between the two columns of slats whereby one of said columns can be folded over the other of said columns,
second intermediate hinges made of flexible material interconnecting adjacent slats in each of said columns whereby said columns can be folded in accordion fashion,
a warning indicia formed on the outer surface of said slats and extending over both of said columns; and
means for attaching said slats to said vehicle, said attaching means including an additional slat in each of said columns and belt means connecting said additional slats to the top slats in said columns.

* * * * *